F. I. NORTON.

Drying Apparatus.

No. 3,327. Reissued March 16, 1869.

Witnesses
H. C. Ashkettle
J. A. Fraser

Inventor
F. I. Norton
per Munn & Co
attorneys.

United States Patent Office.

F. I. NORTON AND WILLIAM H. CLOUD, OF FREMONT, OHIO, ASSIGNEES OF F. I. NORTON.

*Letters Patent No.* 77,205, *dated April* 28, 1868; *reissue No.* 3,327, *dated March* 16, 1869.

IMPROVEMENT IN DRYING-APPARATUS.

The Schedule referred to in these Letters Patent and making part of the same.

*To all whom it may concern:*

Be it known that F. I. NORTON, of Fremont, in the county of Sandusky, and State of Ohio, has invented a new and improved Drying-Apparatus; and we, F. I. NORTON and WILLIAM H. CLOUD, of the same place, assignees of the said F. I. NORTON, do hereby declare that the following is a full, clear, and exact description thereof, which will enable others skilled in the art to make and use the same, reference being had to the accompanying drawings, forming part of this specification.

The object of this invention is to produce a simple and efficient means and apparatus for drying wagon-hubs, lumber, and timber, but more especially such articles of wood which are perforated with holes; and The invention consists—

First, in heating and drying such perforated articles, by carrying steam-pipes through their apertures, so that the inner sides may be fully exposed to the heat radiating from the said steam-pipe.

Second, in conducting steam into the said apertures of the said articles to be dried, for the purpose of having the soluble parts of the wood dissolved by steam, and for having them carried off by the steam, so that the wood, when dry, will not contain any injurious material.

The invention finally consists in the construction of an apparatus for producing the aforesaid effect.

In the accompanying drawings—

Similar letters of reference indicate corresponding parts.

Figure 1:
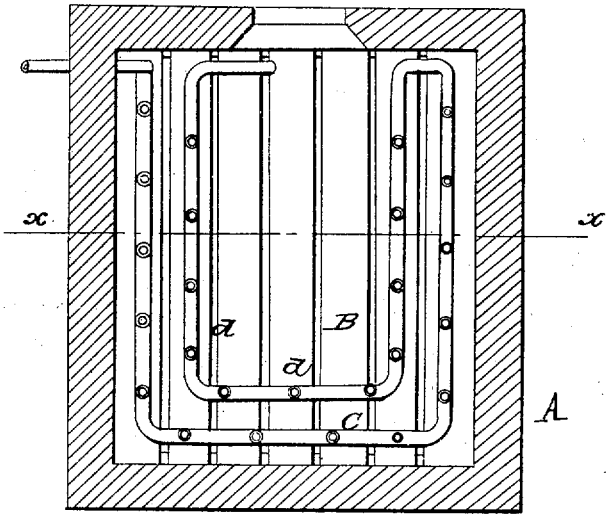
Figure 1 represents a plan view, partly in section, of my improved drying-apparatus.
Figure 2:
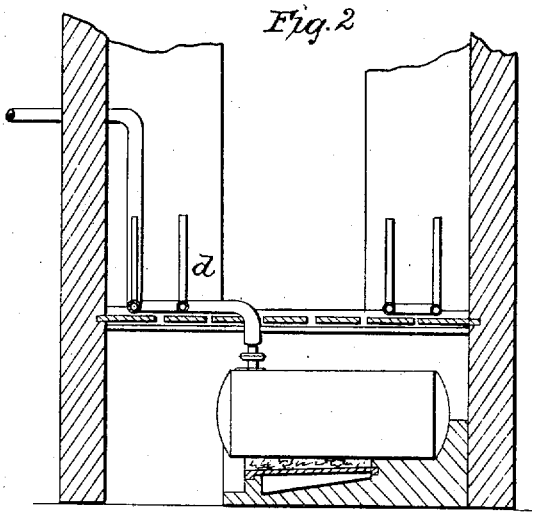
Figure 2 is a vertical section of the same, taken on the plane of the line *x x*, fig. 1.

A represents a building, or structure, of suitable size, and made of brick, stone, metal, or other material, of any suitable shape.

It has, or may have, a floor, B, which can be on the ground, or elevated above the same, as may be desired. This floor is, or may be, perforated, or slotted, but it may as well be solid.

Upon the bottom of the structure A is arranged a coil, C, of steam-pipe, which is connected with a suitable steam-boiler, D, as shown.

From the horizontal pipe C project a series of vertical pipes, *d d*, which have their upper ends capped, but provided with small orifices for the escape of steam.

The articles of wood, such as hubs, &c., to be dried, are, when perforated, slipped upon the pipes *d*, and their inner sides are, therefore, exposed to the action of the heat that radiates from said pipes, while their outer sides will be enveloped in the steam which escapes from the upper end of the pipes *d*, and which consequently fills the entire structure, the same being closed on top, as well as on the sides, while in operation.

The hubs are thus entirely dried, and will be of better quality, when thus prepared, than they would be were they simply treated in the ordinary manner.

The pipes *d* may be made just short enough to simply fit into the lower one of a series of hubs, so that steam will be blown through the apertures of the same, thereby being brought in contact with the inner as well as outer sides of the hubs.

Other perforated timber, or wooden articles may be treated in a similar manner.

For long timber, however, which is longitudinally perforated, we prefer to simply introduce one end of a steam-pipe in one end of the opening, and to then blow the steam through the aperture, without enveloping the whole timber in steam.

For this modified process, the structure A would, therefore, not be required.

After such timber would have been saturated with steam, we propose to add to the length of pipe, or otherwise so arrange the position of the parts, that the pipe would entirely fill the aperture of the timber. When, then, steam is let into the pipe, the heat radiating from it will enter the timber and dry it completely.

Lumber and other non-perforated articles of wood may also be dried in the apparatus, which is shown in the drawing, by being placed between the pipes *d*.

Having thus described the invention,

We claim as new, and desire to secure by Letters Patent—

1. The herein-described process of drying perforated timber and other articles of wood, by forcing steam through the apertures, afterward filling said apertures with heated steam-pipes, as set forth.

2. Drying wagon-hubs and other articles of wood, by fitting them around and upon steam-pipes *d*, within a structure, A, so that they may be enveloped by steam, as specified.

3. The combination of the steam-coil C and vertical-radiating and steam-pipes *d*, substantially as and for the purpose described.

4. The combination, with a drying-chamber, A B, of the steam-pipes C *d*, substantially as and for the purpose described.

F. I. NORTON.
WM. H. CLOUD.

Witnesses:
WILLARD I. NORTON,
J. L. GREENE, Jr.